United States Patent Office 3,441,654
Patented Apr. 29, 1969

3,441,654
TRANSPOSED ELECTRIC LINE, PARTICULARLY FOR USE IN TELECOMMUNICATION SYSTEMS
Sven Sigurd Nordblad, Mexico City, Mexico, assignor to Telefonaktiebolaget L M Ericsson, Stockholm, Sweden
Filed Jan. 12, 1967, Ser. No. 608,761
Claims priority, application Sweden, Jan. 14, 1966, 473/66
Int. Cl. H01b 11/00, 11/06
U.S. Cl. 174—33         7 Claims

ABSTRACT OF THE DISCLOSURE

An electric line, particularly useful in telecommunication systems, and a method of manufacturing such a line in which at least three conductors or three pairs of conductors are combined into a group of conductors and at least three groups of conductors are combined to form the line and the group or the line or both, as the case may be, includes a plurality of relatively-short sections of predetermined lengths, at least two of the conductors or groups in a given section are in juxtaposition and the relative cross-sectional spacing of the conductors within the group or the groups within the line remain substantially the same over the full length of the section in question.

---

Figure 1:
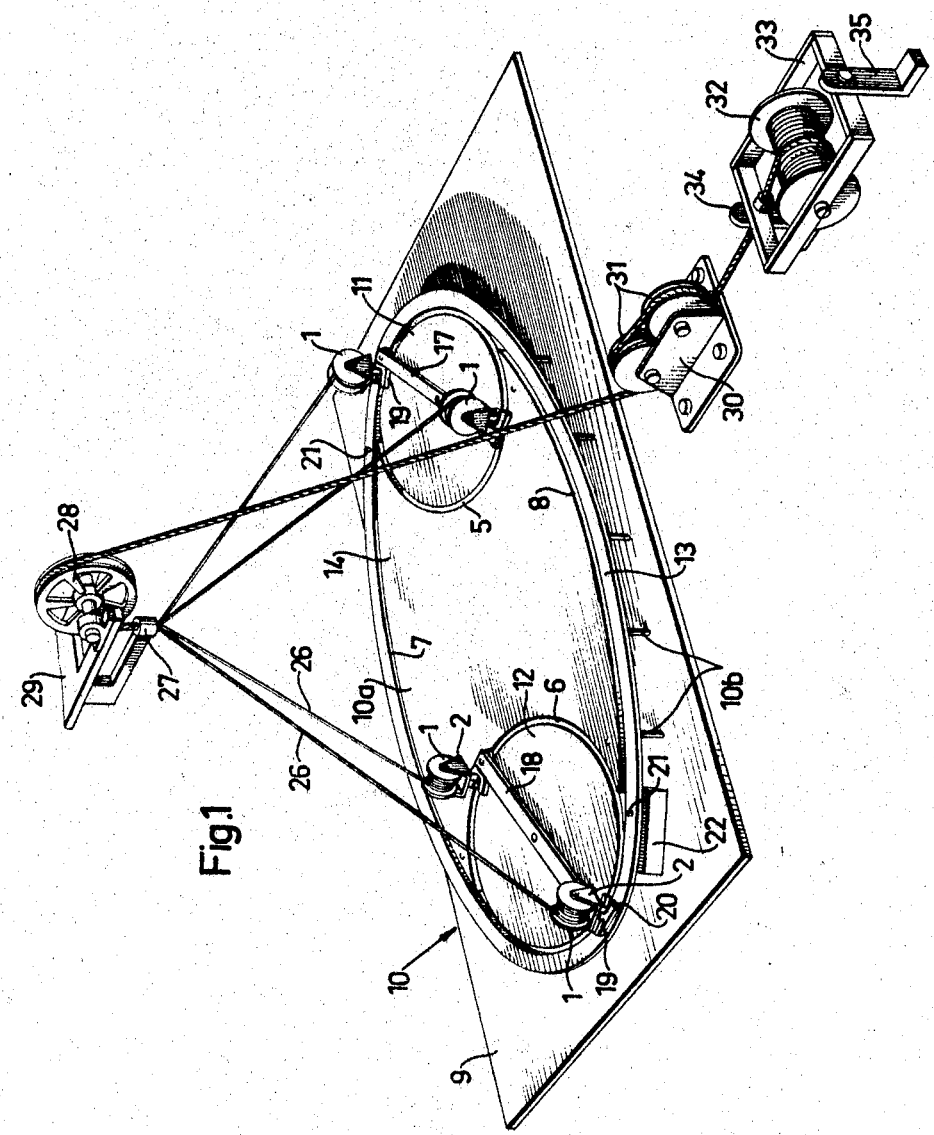

The present application is a continuation-in-part of previously-filed, copending application Ser. No. 563,012, filed June 21, 1966, and previously-filed application Ser. No. 344,469, filed Feb. 12, 1964, now abandoned, both by the present inventor and both carrying the title "An Electric Line, Particularly For Use In Telecommunication Systems, And A Method Of Manufacturing Such An Electric Line."

This invention relates to an electric line of the kind particularly adapted for use in telecommunication systems and comprising a plurality of insulated conductors arranged in one or more groups. The expression "electric line" is herein used in its most extensive sense. Thus, it includes, inter alia, underground cables, serial cables, strands of such cables, etc. The invention also relates to a method of manufacturing such an electric line.

For the transmission of telecommunication signals on cable it has been preferred to use substantially symmetrical circuits. The most simple embodiment of such a cable is a cable wherein each group of conductors comprises only two conductors, i.e. a pair. Both conductors of the pair are then arranged so as to have identical characteristics with respect to the ambient, for instance with respect to earth, their cable sheath, if any, and adjacent pairs within the cable. In order to achieve such characteristics both conductors do not only have equal conductor diameters but are also provided with insulating layers which are geometrically and electricaly equal. Moreover, in such a cable the conductors within each pair are twisted, on the one hand to form an integral unit, and on the other, to assure that voltages and currents, respectively, which are induced in the two conductors by parasitic electric and magnetic fields, will have the same magnitude and the same direction in both conductors so that there will be no net interfering current or voltage within the pair. In order to eliminate the risk of interference phenomena between different pairs in a cable generally known as "cross-talk," the twist pitch has to be different from one pair to another, at least as far as adjacent pairs are concerned.

A signal transmitted by a pair of conductors is successively damped along the length of the cable. The degree of damping depends, of course, primarily upon the resistance of the conductors but also upon the capacitance between the conductors which is a function of the distance between the conductors. Thus, conductors which are tightly packed together will exhibit a higher damping than those which are more spaced. Considering a given cable cross-section, a lower damping can be achieved in each pair by combining the conductors into groups in a particular manner. Thus, instead of arranging the conductors in groups of two conductors it has been proposed to combine the conductors into groups each containing four conductors.

The most simple embodiment of such a group consisting of four conductors is the "star quad." In such a quad the risk of interference between the two pairs is reduced because each pair is composed of diagonally opposite conductors. The electric and magnetic fields generated by the current flowing through the one pair do not cause any net induced interference current in the other pair.

Beyond the lower damping in a cable consisting of a number of star quads, relative to a cable composed of pairs of twisted conductors and having the same cross-section, a cable of star quads also permits a still better utilization of the available space and of the total number of conductors within the cable. Thus, it has been found that a quad also presents a third circuit, generally called "phantom circuit," the one part of which is constituted by the two conductors in the one pair and the other part of which is formed by the two conductors in the other pair. Since the use of phantom circuits is well known within the art there is no need for any detailed description thereof in this connection.

As mentioned above, the degree of damping also depends upon the capacitance within the respective pairs. It has been observed that there is a definite relationship between the capacitance of each pair and the capacitance of the phantom circuit in a star quad. Particularly, when using coil loading the damping in a phantom circuit will be considerably higher than the damping in the pair circuits for transmission within the same frequency band. This is a serious drawback since in most cases it is, of course, desired to obtain the same damping in all circuits within the cable. As above explained it is possible to avoid or eliminate, respectively, any interference caused by outer fields or by fields from adjacent circuits within the same cable by using twisted pairs and star quads, etc. However, this is true only in strictly ideal cases. Thus, in practice it is never possible to obtain complete symmetry. In particular, it has been found very difficult to attain a low interference level between the phantom circuit and the pair circuits within a star quad. This fact together with the fact that the damping in the phantom circuit is comparatively high in proportion to the damping in the pair circuits, has led to a very restricted use of the phantom circuit in the star quad.

There is also another well-known type of quad, generally called "double pair." This quad consists of two separately twisted pairs of conductors which in turn are twisted together. In this quad each pair has a twist pitch which is different from that of the other pair as well as from the twist pitch of the quad and which also differs from the twist pitch of at least the adjacent pairs and quads. It has been found that the damping level in a quad of this type is less than that of the star quad. However, in the double pair quad the damping in the phantom circuit is somewhat lower than the damping in the pair circuits. This fact does, in combination with the more favorable cross-talk values in a quad of this type, explain why out of the two above-mentioned quad types the double pair quad has found the widest use in connection with phantom circuit utilization.

In order to eliminate the difficulties in suppressing cross-talk between different pairs encountered in connection with the manufacture of cable containing a number of pairs of quads or a number of strands, respectively, it has been proposed to twist the conductors intended to form a pair, a quad or a strand, respectively, in such a way that the twist pitch will, at least within a predetermined range, vary at random along the length of the line. In, for instance, a strand manufactured in this way pairs or quads which are located adjacent each other at one point along the cable will lie adjacent each other at all other points along the cable. Therefore, the risk of cross-talk between adjacent pairs or quads is high also in cables of this kind.

For the purpose of reducing cross-talk within a group of conductors or between adjacent conductor groups it has also been proposed to shift the relative positions of some conductors or pairs of conductors along a shorter length of line determine through measuring the electric characteristics of the line. This method makes it possible to obtain a reduced cross-talk between certain pairs of conductors. However, it is quite clear that this method also fails to produce an approximately complete elimination of cross-talk within a conductor group or between different conductor groups, since such elimination of cross-talk requires that all conductors within such a group must have identically equal electric properties.

It has been found that the above mentioned requirements can be complied with if the line is formed by conductors or groups, respectively, which are plaited together at random.

The present invention relates to an alternative solution which makes it possible to obtain a line having the desired properties without use of randomized plaiting.

A line formed in accordance with the invention is primarily characterized in that the relative positions of the conductors within at least one group containing at least three conductors and/or the relative positions of at least three groups vary regularly along the line according to such a pattern that, for a given length of line, the total length along which two arbitrarily chosen conductors within said group or two arbitrarily chosen groups, respectively are in juxtaposition is substantially constant and independent of which conductors or groups, respectively, are considered.

In functional respect the above line is entirely equivalent to a line having a randomized structure and exhibits like such a line, inter alia, the following advantages, namely a reduced cross-talk, also between pair and phantom circuits, small differences between the attenuation values of the pair and phantom circuits, and the possibility of producing line groups containing any desired number of conductors and of combining the conductors within a group into pair circuits in any desired manner.

As compared with a line comprising conductors or groups of conductors, respectively, plaited together at random the line according to the present invention exhibits, inter alia, the advantage of simplifying any required compensation for such unbalances that may be caused, e.g. by varying thickness of the insulation of the conductors, due to the possibility of intervening in and amending in any desired manner the program according to which the conductors are twisted or plaited together.

As mentioned above, the invention also relates to a method of manufacturing a line of the kind above described, wherein at least three insulated conductors or groups of such conductors, respectively, stored on bobbins, are wound off from said bobbins and combined into a bundle wound up on a collector drum. The method according to the invention is primarily characterized by varying the relative positions of the conductors or groups, respectively, during the step of combining them into said bundle, according to such a regular pattern that for a given length of line the total length, along which two arbitrarily chosen conductors or groups, respectively, are arranged in juxtaposition in the finished line, will be substantially constant and independent of which conductors or groups, respectively, are considered.

According to the invention said variation in the relative positions of the conductors or groups, respectively, can be effected either by varying the relative positions of the bobbins in a predetermined regular manner or through using any other suitable means which might permit the bobbins to be kept in fixed positions during the entire manufacturing process.

Figure 2:
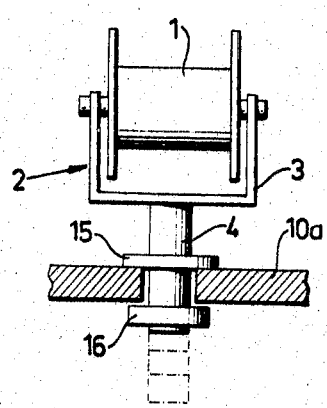
Figure 3:
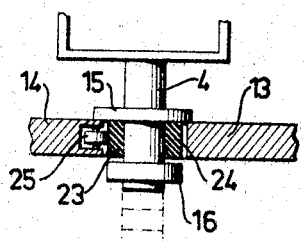
Figure 4:
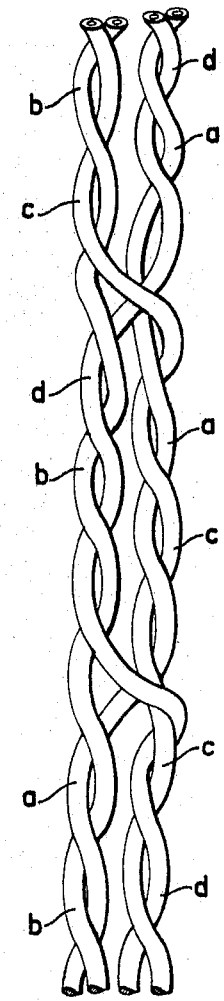

Below the invention will be described more in detail, reference being had to the accompanying drawings, on which FIGURE 1 shows a perspective view of an arrangement for manufacturing a line according to the invention, while FIGURES 2 and 3 show partial views illustrating the guiding of the bobbin carrying means in said arrangement, and FIGURE 4 schematically illustrates a line manufactured by the arrangement according to FIGURE 1.

The arrangement according to FIGURE 1 comprises four bobbins 1 carrying the conductors or conductor groups, respectively, to be combined into the manufactured line. The bobbins 1 are supported on fork-shaped carrying means which, as appears more clearly from FIGURE 2, comprises an upper U-shaped portion 3 in which the respective bobbin 1 is supported freely rotatable and a lower shaft portion 4 having the shape of a circular pin and serving as a guide pin. By means of their vertical guide pins 4 the bobbin carrying means 2 are guided in horizontally extending guide slots 5, 6, 7 and 8 in a stand resting on a horizontal substrate surface 9. Said stand comprises a horizontal plate generally designated 10a, which is supported at a short distance above the substrate surface 9 by means of vertical legs 10b and in which said guide slots 5, 6, 7 and 8 are provided. It appears from FIGURE 1 that the slots 5 and 6 extend circularly and are disposed at opposite ends of the plate 10a, while the slots 7 and 8 form together an ellipse which falls tangent to the first mentioned slots. The slots 5, 6, 7 and 8 divide the plate 10a into four separate portions, namely two cylindrical plates 11 and 12, an elliptical, annular portion 13 forming the outer circumferential portion of the plate 10a, and an inner elliptical plate 14 having circular recesses at its opposite ends. The parts of the upper surface of the plate 10a surrounding the slots 5, 6, 7 and 8 form sliding surfaces on which the carrying means 2 rest by means of annular flanges 15 rigidly mounted on the guide pins 4 (see FIGURE 2). The bobbin carrying means 2 are prevented from tilting in the guide slots by means of clamp rings 16 mounted on the guide pins 4 immediately below the plate 10a.

Each circular plate 11 and 12, respectively, carries a rotor arm 17 and 18, respectively, which is centrally journalled on the respective plate and extends diametrically with respect to said plate and is provided at each end thereof with gripping means 19 for gripping the bobbin carrying means 2. Each gripping means 19 is pivotally connected to the rotor arm 17 or 18, respectively, and at its free end provided with a U-shaped recess for receiving the guide pin 4 of a bobbin carrier 2. The gripping means 19 is further spring-loaded towards an inner end position in which the recess thereof is positioned on a distance from the rotational axis of the arm 17 or 18, respectively, corresponding to the radius of the circular slots 5 and 6. Moreover, each gripping means 19 is on its lower side provided with a groove 20 co-operating with a pin 21 operatively connected to an electromagnet 22 which is arranged to raise said pin 21 through an opening in the outer annular portion 13 of the plate 10a in response to control signals fed thereto. Such a pin 21 with associated electromagnet 22 is provided, on the one hand, at the junction between the slots 6 and 8 and, on the other hand, at the junction between slots 5 and 7. The two pins 21 are arranged in such a manner that, when raised they will cause a passing gripping means 19 to be swung radially outwards into a position in which a bobbin carrying means 2 moved along the circular slot 5 or 6 by said gripping means will be delivered into the guide slot 7 or 8, respectively.

The arrangement is also provided with conveying means for transferring the bobbin carrying means 2 between the circular slots 5 and 6 along the transfer slots 7 and 8, respectively. In FIGURE 3 said conveying means has been shown as consisting of a belt conveyor in the shape of an inner belt 23 and an outer belt 24 of which the first mentioned is supported by rollers 25, evenly distributed along the length of the respective transfer slot 7 and 8 and rotatably mounted in the adjacent edge portion of the plate 14, while the second belt 24 extends externally of the inner belt. When a bobbin carrying means 2 is moved with its guide pin 4 into a position between the two belts 23 and 24 it is caught and conveyed by said belts to the opposite end of the respective transfer slot 7 and 8 where it is gripped by a passing gripping means 19.

During the manufacture of the line the conductors or conductor groups, respectively, stored upon the bobbins 1 are wound off from said bobbins and collected by a collector ring 27 from which they pass over a pulley wheel 28 carried by a beam 29. The means for feeding the line formed by the conductors 26 comprises two double-grooved pulleys 31 which are journalled in a fixed bracket 30 and from whic hthe line is fed to a collector drum 32, rotatably mounted in a frame 33 which is in turn rotatably supported by two brackets 34 and 35. In the pivot of frame 33 in bracket 34 there is provided a central passage through which the line passes on to the collector drum 32 which is turnable by the frame 33 in a plane containing the rotational axis of the drum.

The function of the arrangement above described will now be explained more in detail.

The conductors stored on bobbins 1 are wound off from said bobbins through the feeding action of pulleys 31 and collector drum 32 and combined to a bundle, forming the finished line, by the collector ring 27. Simultaneously, the bobbin carrying means 2 operated by the gripping means 19 are caused to move with their bobbins 1 along the circular slots 5 and 6, said motion being effected through imparting a rotational motion to rotor arms 17 and 18 by suitable driving means (not shown). The conductors 26 will now be twisted together into two pairs which in turn are twisted together due to the rotational motion of frame 33. The two rotor arms 17 and 18 can be rotated at mutually different speeds so that each conductor pair will have an individual twisting length. Through actuation of the electromagnets 22 the pins 21 are caused to be raised at regular intervals in order to devert a bobbin carrying means 2 from each circular slot 5 and 6, respectively, to the interconnecting transfer slots 7 and 8, respectively, along which the bobbin carrying means 2 with the bobbins 1 carried thereby are moved to the next following circular slot 6 and 5, respectively, where they are again caught by an unoccupied gripping means 19 and caused to rotate along the last mentioned slot. As a consequence of this repeated transfer of the bobbins 1 from the one circular slot to the other the conductors of each pair will be successively shifted along the length of the line. In order to ensure that the devertion of the bobbin carrying means 2 from a circular slot 5 or 6, respectively, to a transfer slot 7 or 8, respectively, will occur in the desired sequence the arrangement can be provided with means permitting actuation of the electromagnet 22 only when the desired bobbin carrying means 2 approaches the junction between said slots. For instance, said means may be arranged to sense the length of the guide pins 4 which, as shown with broken lines in FIGURES 2 and 3, can be different for the different bobbin carrying means.

FIGURE 4 illustrates schematically an electric line manufactured by an arrangement of the above described type, said line comprising four conductors $a$, $b$, $c$ and $d$ which are twisted together. As appears clearly from said figure, the line is formed by two conductor pairs the composition of which changes along the length of the line.

Thus, in the lower section of the line in FIGURE 4 the two conductors $a$ and $b$ form the one pair and the two conductors $c$ and $d$ the second pair, while the corresponding pairs in the middle section of the line are formed by the conductors $d$ and $b$, and $a$ and $c$, respectively, and in the upper line section by conductors $b$ and $c$, and $a$ and $d$, respectively. For the purpose of clarification the two different pairs within each group have not been shown as twisted together in FIGURE 4.

The above described arrangement can be modified in many different ways, inter alia, in view of different requirements regarding the structure of the line, such as the number of conductors therein, which may be arbitrarily large.

If the above arrangement is to be used for the manufacture of a line comprising five conductors it may be arranged so that, during the transfer of the bobbin carrying means 2 along the slots 7 and 8, the movement of said means is temporarily interrupted so that they are retained in one of said slots during one twisting period. This means that one bobbin 1 will be kept in a fixed position along a transfer slot while the four other bobbins 1 are moved along the circular slots 5 and 6.

During the manufacture of a line according to the invention it can in some cases be desired to modify the process in order to compensate for any unbalances in the electric characteristics of the line determined through measurement of the cross-talk or of capacitances between different conductors, such balances may for instance be caused by variations in the thickness of the insulation of the conductors. The required compensation can be effected through amending in a suitable manner the program according to which the conductors are plaited or twisted together.

What is claimed is:

1. An electric line, comprising, at least one group of at least three continuous conductors in which at least two of said conductors are in juxtaposition and the relative, cross-sectional spacings of said conductors, including said juxtapositioned conductors, remain substantially the same over the full length of each of a plurality of relatively-short sections of predetermined lengths of said group and the cross-sectional spacings of one of said juxtapositioned conductors in any selected one of said sections changes with respect to another of said juxtapositioned conductors in the next adjacent section.

2. An electric line in accordance with claim 1 wherein the line includes at least three groups of conductors in which at least two of said groups are in juxtaposition and the relative, cross-sectional spacings of said groups, including said juxtapositioned groups, remain substantially the same over the full length of each of a plurality of relatively-short sections of predetermined lengths of said group and the cross-sectional spacing of one of said juxtapositioned groups in any selected one of said sections changes with respect to another of said juxtapositioned conductors in the next adjacent section.

3. An electric line in accordance with claim 1 wherein the juxtapositioned conductors are interlocked.

4. An electric line in accordance with claim 3 wherein the interlocked conductors are twisted conductors.

5. An electric line, comprising, at least three groups of conductors in which at least two of said groups are in juxtaposition and the relative, cross-sectional spacings of said groups, including said juxtapositioned conductors, remain substantially the same over the full length of each of a plurality of relatively short sections of predetermined lengths of said line and the corss-sectional spacing of one of said juxtapositioned groups in any selected one of said sertions changes with respect to another of said juxtapositioned groups in the next adjacent section.

6. An electric line in accordance with claim 5 wherein the groups in juxtaposition are interlocked.

7. An electric line in accordance with claim 6 wherein the interlocked groups are twisted groups.

References Cited

UNITED STATES PATENTS

| | | | |
|---|---|---|---|
| 2,678,527 | 5/1954 | Meyers et al. | 57—59 |
| 2,958,724 | 11/1960 | Milloit | 174—33 X |
| 3,020,330 | 2/1962 | Huska | 174—34 |

FOREIGN PATENTS 18,223    6/1928    Netherlands.

LEWIS H. MYERS, *Primary Examiner.*

A. T. GRIMLEY, *Assistant Examiner.*

U.S. Cl. X.R.

336—187